United States Patent
De Almeida et al.

(10) Patent No.: US 9,656,696 B2
(45) Date of Patent: May 23, 2017

(54) DEVICE FOR ATTACHING TWO STRUCTURAL PARTS TO EACH OTHER, COMPRISING A FLOATING POSITIONING ELEMENT

(71) Applicant: RENAULT s.a.s., Boulogne Billancourt (FR)

(72) Inventors: Luis Filipe De Almeida, Beynes (FR); Olivier Duong, Eragny sur Oise (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/439,775

(22) PCT Filed: Oct. 21, 2013

(86) PCT No.: PCT/EP2013/071981
§ 371 (c)(1),
(2) Date: Jun. 26, 2015

(87) PCT Pub. No.: WO2014/067808
PCT Pub. Date: May 8, 2014

(65) Prior Publication Data
US 2015/0291221 A1   Oct. 15, 2015

(30) Foreign Application Priority Data
Oct. 30, 2012 (FR) ...................... 12 60324

(51) Int. Cl.
*B62D 25/14* (2006.01)
*B62D 27/02* (2006.01)
*B23K 31/02* (2006.01)

(52) U.S. Cl.
CPC ............ *B62D 25/147* (2013.01); *B23K 31/02* (2013.01); *B62D 27/023* (2013.01)

(58) Field of Classification Search
CPC ..... B23K 31/02; B62D 25/147; B62D 27/023
See application file for complete search history.

(56) References Cited

U.S. PATENT DOCUMENTS

| 5,387,023 A | 2/1995 | Deneau |
| 6,883,230 B2 * | 4/2005 | Matsumoto .......... B62D 25/145 29/281.4 |

(Continued)

FOREIGN PATENT DOCUMENTS

| DE | 4134436 A1 * | 4/1992 | ............. B62D 25/14 |
| DE | 10003981 A1 * | 8/2001 | ........... B62D 25/147 |

(Continued)

OTHER PUBLICATIONS

International Search Report issued Jan. 21, 2014 in PCT/EP2013/071981 Filed Oct. 21, 2013.

(Continued)

*Primary Examiner* — Glenn Dayoan
*Assistant Examiner* — Paul Chenevert
(74) *Attorney, Agent, or Firm* — Oblon, McClelland, Maier & Neustadt, L.L.P.

(57) ABSTRACT

A device for attaching a cross-member of a dashboard to a front pillar lining, the device including: a reinforcing element including a first positioning element for cooperating with a second positioning element secured to the dashboard such that they occupy a relative determined position. An attachment element is used to immobilize the assembly in the determined position. The attachment element is configured such that the connection between the first positioning element and the reinforcing element includes a position regulating mechanism configured to vary between an unlocked state in which the position of the first positioning element is adjustable in relation to the reinforcing element, (Continued)

and a locked state in which the first positioning element is fixed in relation to the reinforcing element.

16 Claims, 4 Drawing Sheets

(56) References Cited

U.S. PATENT DOCUMENTS

| | | | | |
|---|---|---|---|---|
| 7,594,690 B2 * | 9/2009 | Hedderly | ............... | B60J 5/0405 16/242 |
| 2006/0138806 A1 * | 6/2006 | Arroupe et al. | ..... | B62D 25/147 296/193.02 |
| 2016/0052562 A1 * | 2/2016 | Yoshida | ................ | B62D 25/14 296/72 |

FOREIGN PATENT DOCUMENTS

| | | | | | |
|---|---|---|---|---|---|
| DE | 10010709 | C1 * | 8/2001 | ........... | B62D 25/147 |
| DE | EP 1332950 | A1 * | 8/2003 | ........... | B62D 25/147 |
| DE | 10256130 | A1 * | 6/2004 | ........... | B62D 25/147 |
| DE | 10 2009 024 084 | A1 | 12/2010 | | |
| DE | 102012022783 | A1 * | 5/2014 | ........... | B62D 25/145 |
| FR | 2739596 | A1 * | 4/1997 | ............ | B60J 5/0425 |
| FR | 2757473 | A1 * | 6/1998 | ........... | B62D 25/147 |
| FR | EP 0945294 | A1 * | 9/1999 | ............ | B60J 5/0426 |
| FR | 2850945 | A1 * | 8/2004 | ............. | B62D 25/04 |
| FR | 2851981 | A1 * | 9/2004 | ............. | B62D 25/04 |
| FR | WO 2009000988 | A3 * | 2/2009 | ............. | B62D 25/04 |
| JP | EP 1253069 | A2 * | 10/2002 | ............ | B62D 25/145 |
| WO | WO 0021767 | A1 * | 4/2000 | ......... | E05D 11/0027 |

OTHER PUBLICATIONS

French Preliminary Search Report issued Jul. 16, 2013 in Patent Application No. FR 12 60324 Filed Oct. 30, 2012 (with English translation of categories of cited documents).

* cited by examiner

DEVICE FOR ATTACHING TWO STRUCTURAL PARTS TO EACH OTHER, COMPRISING A FLOATING POSITIONING ELEMENT

TECHNICAL FIELD OF THE INVENTION

The invention relates to an attaching device which is designed to attach a first structural part of a structure of a motor vehicle, in particular a dashboard cross-member, on a second structural part of this structure, in particular a front foot lining, the device comprising:
- a reinforcement element, in particular in the form of an angle iron, which is designed to be attached on the second part, in particular by welding;
- a first positioning element, which is connected to the reinforcement element, and is designed to cooperate with a second positioning element which is integral with the first part, such as to make the first part occupy a determined position relative to the second part;
- an attaching element which is designed to immobilize the first part in said determined position.

The subject of the invention is also a fitting system and a fitting method, an arrangement, and a motor vehicle as such.

PRIOR ART

The instrument panel of a motor vehicle, which is also known as the dashboard, is supported by a dashboard cross-member which extends transversely to the passenger space of the vehicle, and connects the two front lateral parts of the vehicle bodywork which are known as the front feet. In addition, the dashboard cross-member optionally has the function of preventing the rotation of the front feet in the event of an impact at their level.

The presence is known in different motor vehicles of an angle iron which is rendered integral firstly with the dashboard cross-member and secondly with the front foot. This connection between the angle iron and the front foot is provided by a through screw which is associated with the angle iron, and ensures the limitation of the rotation of the front foot.

In order to improve the attaching of the dashboard cross-member, for example with reference to document FR-A1-2850945, it is known to provide internal and external housings which are welded on both sides of a wall of the front foot. The end of the dashboard cross-member is attached to the inner housing. It is known to provide on one of the housings a regulating pin which facilitates the putting into place of the cross-member before it is attached.

A solution of this type requires additional cumbersome parts. It therefore remains complex and costly, and its weight is perfectible.

Document EP-B1-1253069 discloses an alternative, wherein the dashboard cross-member is equipped with a system for regulating its positioning relative to the structure of the motor vehicle.

OBJECT OF THE INVENTION

The objective of the present invention is to propose a solution for attaching a first structural part of a structure of a motor vehicle, in particular a dashboard cross-member, on a second structural part of this structure, in particular a front foot lining, which solution eliminates the disadvantages previously listed.

In particular, an object of the invention is to provide an attaching device which is as economical as possible, and is simple, compact and light, but which nevertheless makes it possible to provide a function of regulating the relative positioning between the two structural parts before they are attached.

A first aspect of the invention concerns an attaching device which is designed to attach a first structural part of a structure of a motor vehicle, in particular a dashboard cross-member, on a second structural part of said structure, in particular a front foot lining. The attaching device comprises:
- a reinforcement element, in particular in the form of an angle iron, which is designed to be attached on the second part, in particular by welding;
- a first positioning element, which is connected to the reinforcement element, and is designed to cooperate with a second positioning element which is integral with the first part, such as to make the first part occupy a determined position relative to the second part;
- an attaching element which is designed to immobilize the first part in said determined position.

The attaching device is configured such that the connection between the first positioning element and the reinforcement element comprises a position-regulating mechanism which is configured such as to vary between a state of release, in which the position of the first positioning element relative to the reinforcement element is adjustable, and a blocking state in which the first positioning element is fixed relative to the reinforcement element.

The first positioning element can be configured such as to cooperate with the second positioning element by reciprocal engagement according to a first direction, which in particular is designed to be oriented according to a longitudinal direction of the structure of the motor vehicle, and the regulating mechanism can provide a possibility of clearance of the first positioning element relative to the reinforcement element in at least a second direction which is different from the first direction, and in particular is included on a plane perpendicular to the first direction, thus making it possible to compensate for alignment defects perpendicularly to the first direction, between the first and second positioning elements, at the moment of said reciprocal engagement.

The first positioning element can comprise a centering control system which projects from a first side of a wall of the reinforcement element, and is configured such as to be able to cooperate by engagement according to the first direction in a centering orifice corresponding to the second positioning element.

The regulating mechanism can comprise an element for retention of the centering control system on the reinforcement element, the retention element being fitted such as to float relative to the reinforcement element.

The retention element, which in particular is constituted by a nut engaged with a male threaded part of the centering control system, can be disposed in a receipt seat which has dimensions, on a plane parallel to said wall of the reinforcement element, such that the retention element can be displaced according to a determined course, in the receipt seat, according to at least one direction included on this plane.

The receipt seat can in particular be arranged on a second side opposite the wall of the reinforcement element, and the reinforcement element can comprise an aperture through which the centering control system passes, from one side to the other of the wall.

A second aspect of the invention relates to a fitting system comprising a fitting device of this type, and an attaching plate which is designed to be rendered integral with the first part, the second positioning element being able to be formed in said attaching plate. The attaching plate can comprise at least one centering orifice, in which the first positioning element is engaged according to the first direction. The attaching element can be configured such as to attach the attaching plate on the reinforcement element in a detachable manner. The attaching plate can comprise at least one opening, and the attaching element can comprise at least one male threaded element which passes through said opening and cooperates with a complementary female threaded element which is integral with the reinforcement element.

A third aspect of the invention relates to an arrangement for a motor vehicle comprising a first structural part of a structure of a motor vehicle, in particular a dashboard cross-member, a second structural part of said structure, in particular a front foot lining, and at least one such attaching device and/or one such fitting system, which ensures the attaching of the first part on the second part.

The attaching plate of the fitting system can be integral with the first part, and the reinforcement element is then attached, in particular by welding, on the second part.

A fourth aspect of the invention relates to a motor vehicle comprising at least one such arrangement.

A final aspect of the invention relates to a method for fitting a first structural part of a structure of a motor vehicle, in particular a dashboard cross-member, on a second structural part of said structure, in particular a front foot lining, comprising the steps of:
  providing at least one such attaching device and/or one such fitting system;
  attaching the reinforcement element on the second part, in particular by welding;
  with the regulating mechanism in the released state, putting into place a template which is configured such as to adjust the position of the first positioning element relative to the reinforcement element, in order to position it in a location such that further cooperation of said first and second positioning elements makes the first part occupy said determined position relative to the second part;
  activating the regulating mechanism toward its blocking state.

BRIEF DESCRIPTION OF THE DRAWINGS

Other characteristics and advantages will become more apparent from the following description of particular embodiments of the invention, provided by way of non-limiting examples, and represented in the accompanying drawings, in which.

DESCRIPTION OF PREFERRED
EMBODIMENTS OF THE INVENTION

For greater clarity, an orthonormal reference (X, Y, Z) is associated with the arrangement, wherein X corresponds to the front-to-rear longitudinal direction of the motor vehicle, Y corresponds to its right-to-left transverse direction, and Z corresponds to its vertical direction.

In general and with reference to FIGS. 1, 2, 4 and 5, hereinafter an attaching device is described which is designed to attach a first structural part 10 of a structure of a motor vehicle, in particular a dashboard cross-member, on a second structural part 11 of the structure, in particular an inner wall or front foot lining. However, the invention can apply to any type of first and second structural parts 10, 11, irrespective of their nature, provided that they require accurate positioning relative to one another.

Figure 1:
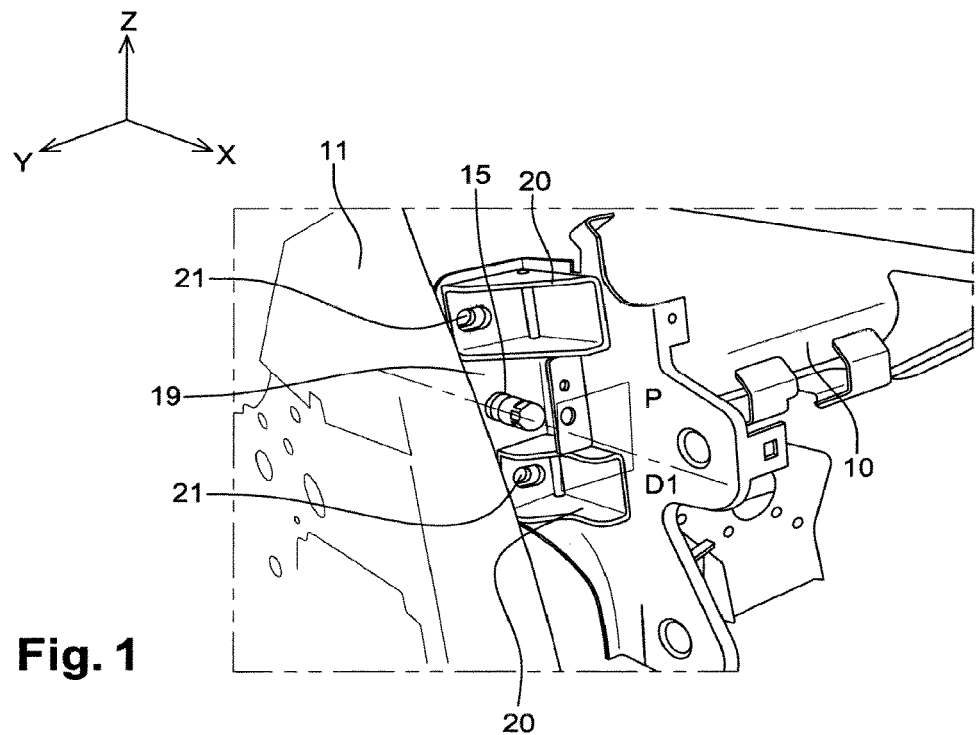
FIG. 1 is a view in perspective illustrating the left part of an arrangement for a motor vehicle using an example of an attaching device according to the invention, in order to ensure the attaching of the left end of the first structural part.
Figure 2:
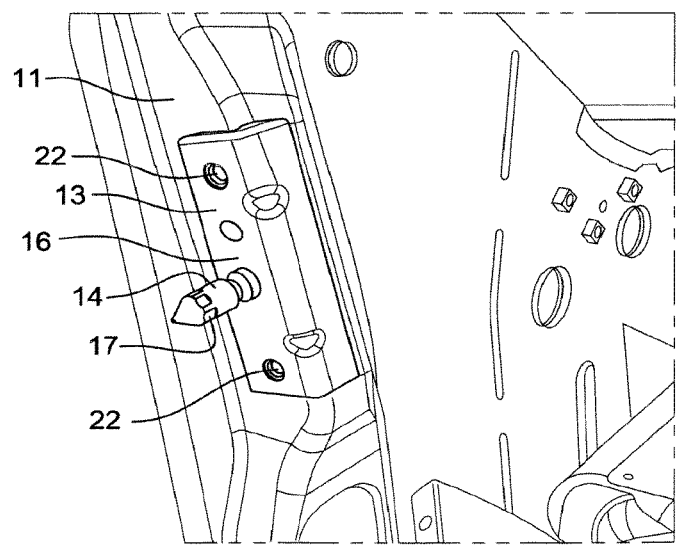
FIG. 2 is a view in perspective illustrating a part of the attaching device, i.e. the reinforcement element and the first positioning element fitted on the second structural part.
Figure 3:
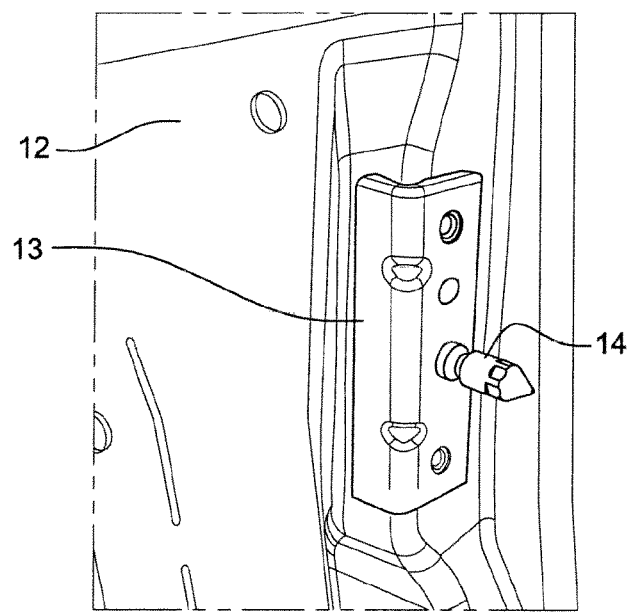
FIG. 3 is a view in perspective illustrating a part of another attaching device, used on the right part of the arrangement, in order to ensure attaching of the right end of the first structural part.
Figure 4:
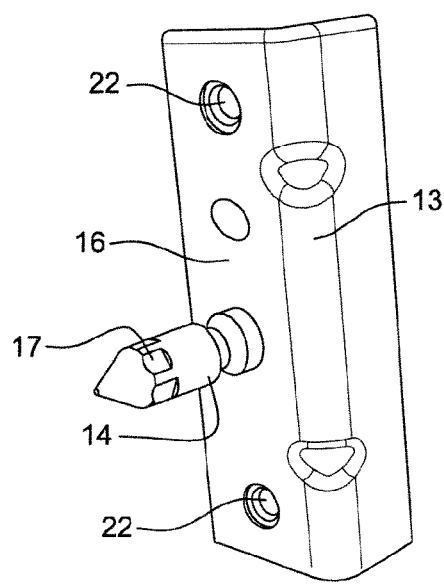
FIGS. 4 and 5 are respectively front and rear views of the reinforcement element and of the first positioning element belonging to the example of an attaching device according to the invention used in FIGS. 1 and 2.
Figure 6:
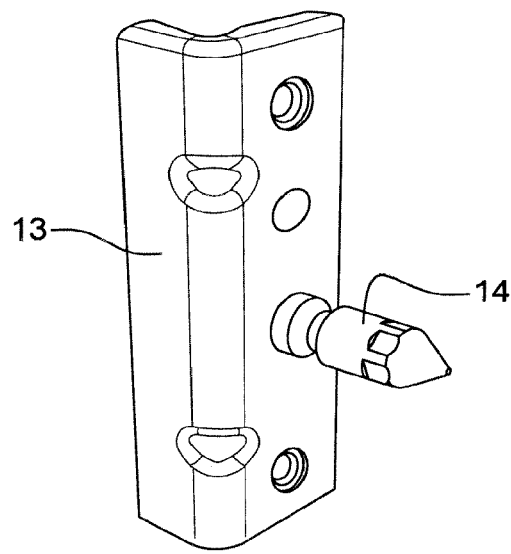
FIGS. 6 and 7 are respectively front and rear views of the reinforcement element and of a positioning element belonging to the attaching device used in FIG. 3.
Figure 7:
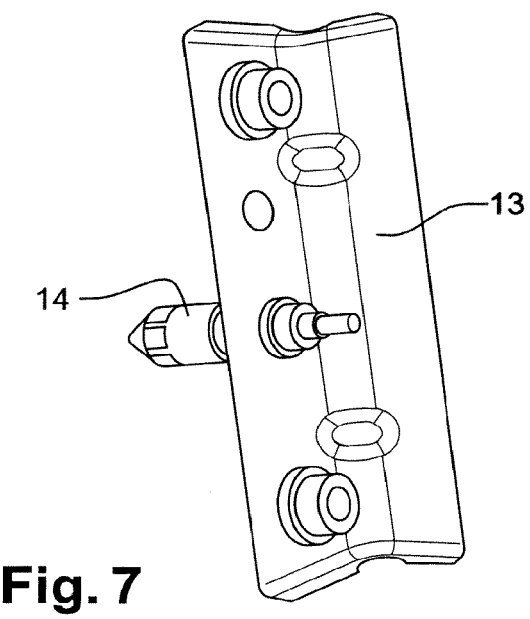

In order to provide a system for fitting of the first part 10 constituted by a dashboard cross-member transversely to the passenger space of the vehicle, between two second structural parts constituted by the left and right front foot linings, use is made of at least one such attaching device. Thus, the attaching device (FIGS. 4 and 5) according to the invention can be used in order to ensure only the attaching of the left end of the first part 10 (FIGS. 1 and 2), the attaching of its right end then being ensured (FIG. 3) by an attaching device (FIGS. 6 and 7) of a different nature. In FIGS. 1 and 2, the left front foot lining constitutes the second structural part 11, whereas the right front foot lining has the reference 12 in FIG. 3. However, it will be appreciated that the system for fitting the first part 10 can alternatively use at least two attaching devices according to the invention as described hereinafter, these two attaching devices then ensuring respectively the attaching of the right and left ends of the dashboard cross-member.

The attaching device (FIGS. 4 and 5) used on the left side (FIGS. 1 and 2) in the fitting of the first part 10, in order to ensure the attaching between the left end of the dashboard cross-member and the left front foot lining (second structural part 11) comprises:
  a reinforcement element 13, in particular in the form of an angle iron, which is designed to be attached on the second part 11, in particular by welding;
  a first positioning element 14 (i.e., a protrusion) which is connected to the reinforcement element 13, and is designed to cooperate with a second positioning element 15 (i.e., an aperture) which is integral with the first part 10, such as to make the first part 10 occupy a determined position relative to the second part 11;
  an attaching element (i.e., a bolt; not shown), which is designed to immobilize the first part 10 in said determined position.

The angle iron which constitutes the reinforcement element 13 is attached directly on the left front foot lining. This can involve the creation of a very distinctive recess on the left front foot lining in order to receive the angle iron, which finally acts as a fitting interface relative to the dashboard cross-member. The reinforcement angle iron is welded in this recess. However, any other attaching means can be provided between the reinforcement element 13 and the front foot lining (screwing, gluing, snapping in, etc.).

According to an essential characteristic of the invention, for the attaching device according to the invention used on the left side, the connection between the first positioning element 14 and the reinforcement element 13 comprises a position-regulating mechanism which is configured such as to vary between a state of release, in which the position of the first positioning element 14 relative to the reinforcement element 13 is adjustable, and a blocking state in which the first positioning element 14 is fixed relative to the reinforcement element 13.

It will thus be appreciated that the assembly formed by the angle iron 13 equipped with this positioning element 14 with an adjustable position has the functions of regulation of the position of the dashboard cross-member and attaching the cross-member once the position has been adjusted, with a lower cost and weight, and simply and compactly.

It should be noted that the attaching device (FIGS. 6 and 7) which is used on the right side (FIG. 3) in the fitting of the first part 10, in order to ensure the attaching between the right end of the dashboard cross-member and the right front foot lining 12, comprises the same elements 13 and 14. However, this attaching device differs from the one in FIGS. 4 and 5 in that it does not comprise a mechanism for regulating the position of the first positioning element 14, as previously described. On the contrary, the first positioning element 14 is fixed relative to the reinforcement element 13, without the possibility of regulating the position before fitting of the cross-member.

Advantageously, the first positioning element 14 is configured such as to cooperate with the second positioning element 15 by means of reciprocal engagement according to a first direction D1, which in particular is designed to be oriented according to the longitudinal direction X of the structure of the motor vehicle. Reciprocal engagement means that the first positioning element 14 is engaged during the fitting in the second positioning element 15 which is integral with the dashboard cross-member, and conversely. The position-regulating mechanism according to the invention provides the possibility of clearance adjustment of the first positioning element 14 relative to the reinforcement element 13 in at least a second direction, different from the first direction, which in particular is included on a plane perpendicular to the first direction D1. A characteristic of this type makes it possible to compensate for alignment defects perpendicularly to the first direction D1, between the first and second positioning elements 14, 15, at the moment of their reciprocal engagement. According to the design of the regulating mechanism, the first positioning element 14 can have the possibility of clearance, in the released state of the system, in any direction, including on a plane P perpendicular to the first direction D1. In other words, the position of the positioning element 14 can be adjusted on a substantially oriented plane (Y, Z).

In the variant illustrated, the first positioning element 14 comprises a centering control system 17 which projects from a first side of a wall 16 of the reinforcement element 13, and is configured such as to be able to cooperate by engagement according to the first direction D1, in a centering orifice (not represented in detail) which constitutes the second positioning element 15. The centering control system 17 is designed to be oriented mainly according to the direction X. However, an inverted organization can be provided, wherein the centering orifice would be contained in the reinforcement element 13, such as to cooperate with a centering control system supported by the cross-member. In particular, the wall 16 is constituted by one of the two wings at 90° to one another of the angle iron which forms the reinforcement element 13.

Figure 5:
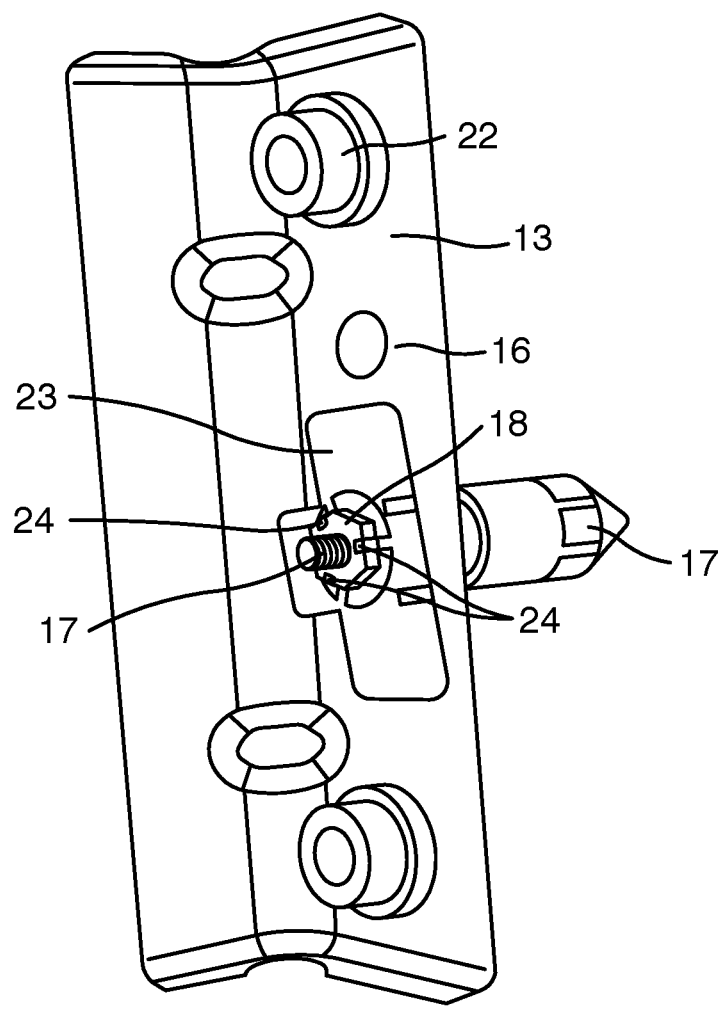

With reference to FIG. 5, the regulating mechanism comprises an element 18 for retention of the centering control system 17 on the reinforcement element 13, the retention element 18 being fitted such as to float relative to the reinforcement element 13. The retention element 18, which in particular consists of a nut engaged with a male threaded part of the centering control system 17, is disposed in a receipt seat 24 formed by the guide part 23 with dimensions on a plane parallel to the wall 16 (and to the plane P previously defined, whilst also being perpendicular to the first direction D1) of the reinforcement element 13, such that the retention element 18 can be displaced according to a determined course in the receipt seat 24, according to at least one direction included on this plane. In this particular variant, the passage from the released state to the blocked state of the regulating mechanism or vice versa is obtained by rotation of the centering control system 17 around D1, relative to the nut which constitutes the retention element 18, and/or by rotation of the nut which constitutes the retention element 18 around D1.

In the variant illustrated, the receipt seat 24 is arranged on a second side of the wall 16 of the reinforcement element 13, opposite the first side from which the centering control system 17 projects. The reinforcement element 13 comprises an aperture (not represented) which passes through the entire thickness of the wall 16, and through which the centering control system 17 passes from one side of the wall 16 to the other, according to the first direction D1. The receipt seat 24 can be delimited by, and formed in, a guide part 23 which is added on against the wall 16, on the second side. The aperture formed in the wall 16 must have dimensions on the plane perpendicular to D1 which are sufficient to permit the previously defined possibility of clearance of the centering control system 17.

However, it continues to be possible to arrange the receipt seat 24 on the same side of the wall 16 as the centering control system 17, such that the through aperture can optionally be eliminated.

As previously stated, the fitting system which comprises a fitting device of this type can additionally comprise an attaching plate 19 which is designed to be rendered integral with the first part 10. Advantageously, the attaching plate 19 is integral with the first part 10, and the reinforcement element 13 is attached, in particular by being welded, to the second part 11. The second positioning element 15, which is constituted by at least one centering orifice in which the first positioning element 14 is engaged according to the first direction D1, is formed in this attaching plate 19. In particular, the centering orifice contained in the dashboard cross-member can be in the form of a through aperture arranged according to X in a suitable wall of the attaching plate 19. The attaching plate 19 can be rendered integral with the end of the dashboard cross-member in any appropriate manner, by welding or an equivalent. Also, the attaching plate 19 can comprise one or a plurality of angle iron(s) 20 designed to reinforce the fitting assembly on a plane (X, Y) against the possibilities of pivoting of the left front foot around Z in the event of impacts.

According to a particular embodiment which depends on the design of the attaching element which belongs to the attaching device, the attaching plate 19 comprises at least one through opening 21 arranged according to X (FIG. 1). The attaching element then comprises at least one male threaded element (not shown) which passes through the opening 21, and which cooperates with a complementary female threaded element 22 (FIG. 2) integral with the reinforcement element 13. In general, the attaching element is configured such as to attach the attaching plate 19 on the reinforcement element 13 in a detachable manner, in this case simply by unscrewing the male threaded element.

In addition to the attaching device and the fitting system, the invention also relates to an arrangement for a motor vehicle comprising:
- the first structural part 10 of the structure of the motor vehicle, in particular the dashboard cross-member;
- the second structural part 11 of the structure, in particular a front foot lining (for example the left front foot lining); and
- at least one such attaching device and/or one such fitting system, which ensures at least partial attaching of the first part 10 on the second part 11.

The fitting of the first structural part 10 on the second structural part comprises the following steps:
- supply of at least one such attaching device and/or one such fitting system;
- attaching the reinforcement element 13 on the second part 11, in particular by welding;
- with the regulating mechanism in position in the released state, putting into place a template which is configured such as to adjust the position of the first positioning element 14 relative to the reinforcement element 13, in order to position it in a location such that further cooperation of the first and second positioning elements 14, 15 makes the first part 10 occupy the determined position relative to the second part 11;
- activating the regulating mechanism toward its blocking state.

These steps are then followed by a step of placement of the first part on the reinforcement element by making the first and second positioning elements 14, 15 cooperate, then by a step of activating the attaching element, in order to block the first part 10 in position relative to the second part 11, in the determined position of the first part, by means of the adjustment of the first positioning element.

Although the principle of the attaching and fitting device previously described is particularly suitable for the particular case of a dashboard cross-member, this principle can equally well be applied to any structural part of a motor vehicle structure which is designed to be fitted on another structural part with accurate positioning.

The solution previously described has the following advantages:
- reduction of the weight of the position-regulating mechanism by approximately 0.95 kg compared with existing solutions;
- reduction of the number of welding spots;
- compliance with the standards for regulation of the cross-member, with the possibility of regulation of the centering control system, and control of the first part relative to the second part when it is fitted on the second part;
- reduction of the cost price of the mechanism, in particular because of the decrease in the weight involved and in the number of welding spots;
- reduction of the investments, since the tooling associated with the reinforcement element is simpler than that of the present housings.

The invention claimed is:

1. An attaching device configured to attach a dashboard cross-member of a motor vehicle on a front foot lining, the device comprising:
- an angle iron configured to be attached on the front foot lining, the angle iron including a guide part;
- a first positioning element, which is connected to the angle iron, and is configured to cooperate with a second positioning element which is integral with the first part, so as to make the dashboard cross-member occupy a determined position relative to the front foot lining;
- an attaching element configured to immobilize the first part in the determined position;
- wherein the connection between the first positioning element and the angle iron comprises a position-regulating mechanism which is configured to vary between a state of release, in which a position of the first positioning element relative to the angle iron is adjustable, and a blocking state in which the first positioning element is fixed relative to the angle iron,
- wherein the regulating mechanism includes a nut engaged on a male threaded part of the first positioning element, the nut being disposed in a receipt seat formed by the guide part of the angle iron, the receipt seat having dimensions, on a plane parallel to the wall of the angle iron, such that the nut can be displaced in the receipt seat according to a determined course in at least one direction included on the plane,
- wherein the first positioning element is configured to cooperate with the second positioning element by reciprocal engagement according to a first direction, which is configured to be oriented according to a longitudinal direction of a structure of the motor vehicle, and
- wherein the regulating mechanism provides clearance of the first positioning element relative to the angle iron in at least a second direction which is different from the first direction, the clearance being provided by the displacement of the nut in the receipt seat, thus compensating for alignment defects perpendicularly to the first direction, between the first and second positioning elements, at a moment of the reciprocal engagement.

2. An attaching device configured to attach a first structural part of a structure of a motor vehicle on a second structural part of the structure, the device comprising:
- a reinforcement element configured to be attached on the second part, the reinforcement element including a guide part;
- a first positioning element, which is connected to the reinforcement element, and is configured to cooperate with a second positioning element which is integral with the first part, so as to make the first part occupy a determined position relative to the second part;
- an attaching element configured to immobilize the first part in the determined position;
- wherein the connection between the first positioning element and the reinforcement element comprises a position-regulating mechanism which is configured to vary between a state of release, in which a position of the first positioning element relative to the reinforcement element is adjustable, and a blocking state in which the first positioning element is fixed relative to the reinforcement element,
- wherein the regulating mechanism includes a nut engaged on a male threaded part of the first positioning element, the nut being disposed in a receipt seat formed by the guide part of the reinforcement element, the receipt seat having dimensions, on a plane parallel to a wall of the reinforcement element, such that the nut can be displaced in the receipt seat according to a determined course in at least one direction included on the plane,
- wherein the first positioning element is configured to cooperate with the second positioning element by reciprocal engagement according to a first direction, which is configured to be oriented according to a longitudinal direction of a structure of the motor vehicle, and wherein the regulating mechanism provides clearance of the first positioning element relative to the reinforcement element in at least a second direction which is different from the first direction, the clearance being provided by the displacement of the nut in the receipt seat, thus compensating for alignment defects perpendicularly to the first direction, between the first and second positioning elements, at a moment of the reciprocal engagement.

3. The attaching device as claimed in claim 2, wherein the first structural part is a dashboard cross-member and second structural part is a front foot lining.

4. The attaching device as claimed in claim 2, wherein the retention element is fitted within the guide part of the reinforcement element to float relative to the reinforcement element.

5. The attaching device as claimed in claim 2, wherein the reinforcement element is an angle iron.

6. The attaching device as claimed in claim 5, wherein the angle iron is welded on the second part.

7. A fitting system comprising:
an attaching device according to claim 2, and
an attaching plate configured to be rendered integral with the first part, and the second positioning element is formed in the attaching plate.

8. The fitting system as claimed in claim 7, wherein the attaching plate comprises at least one centering orifice, in which the first positioning element is engaged according to the first direction.

9. The fitting system as claimed in claim 8, wherein the attaching element is configured to attach the attaching plate on the reinforcement element in a detachable manner.

10. The fitting system as claimed in claim 9, wherein the attaching plate comprises at least one opening, and the attaching element comprises at least one male threaded element which passes through the opening and cooperates with a complementary female threaded element which is integral with the reinforcement element.

11. The attaching device as claimed in claim 2, wherein the first positioning element comprises a centering control system which projects from a first side of a wall of the reinforcement element, and is configured to cooperate by engagement according to the first direction in a centering orifice corresponding to the second positioning element.

12. The attaching device as claimed in claim 11, wherein the nut of the regulating mechanism retains the centering control system on the reinforcement element.

13. The attaching device as claimed in claim 11, wherein the receipt seat is arranged on a second side opposite the wall of the reinforcement element, and the reinforcement element comprises an aperture through which the centering control system passes, from one side of the wall to the other side of the wall.

14. An arrangement for a motor vehicle comprising:
a first structural part of a structure of a motor vehicle;
a second structural part of the structure; and
at least one attaching device according to claim 2, which ensures attaching of the first part on the second part.

15. The arrangement as claimed in claim 14, wherein an attaching plate of the fitting system is integral with the first part, and the reinforcement element is attached on the second part.

16. A motor vehicle comprising at least one arrangement as claimed in claim 14.

* * * * *